D. H. YOUNG.
LINK.
APPLICATION FILED MAY 24, 1918.
1,293,606.
Patented Feb. 4, 1919.
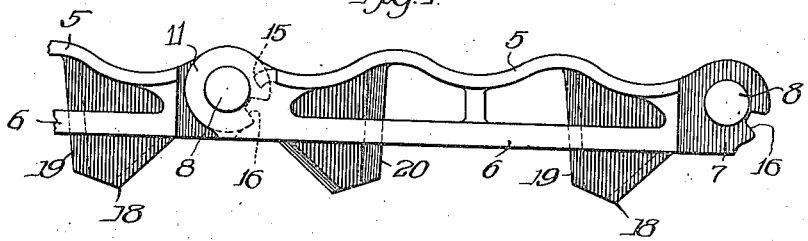
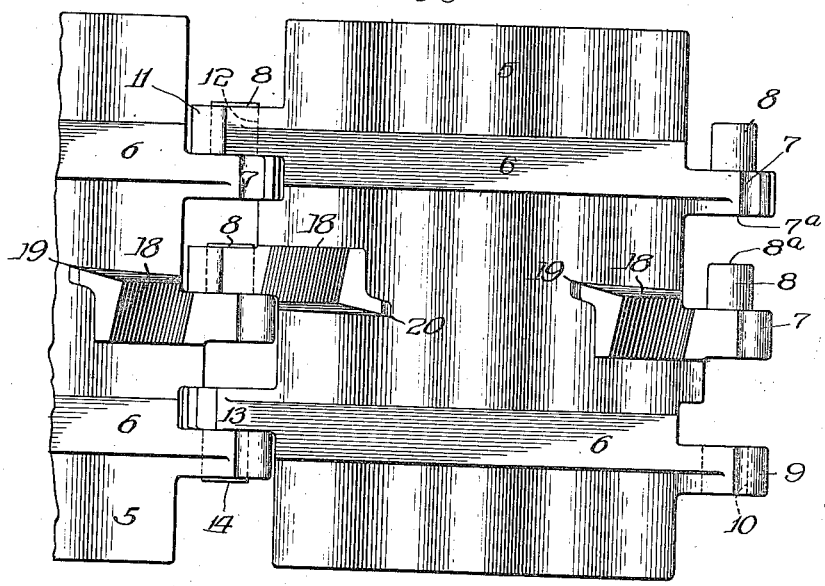
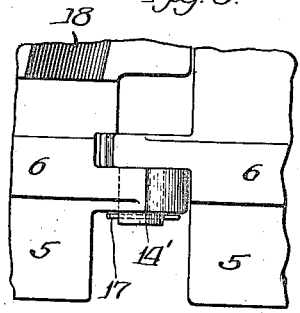
Witnesses:
Inventor
Donald H. Young.
By Wilkinson & Huxley, Attys

UNITED STATES PATENT OFFICE.

DONALD H. YOUNG, OF CHICAGO HEIGHTS, ILLINOIS, ASSIGNOR TO AMERICAN MANGANESE STEEL COMPANY, OF CHICAGO, ILLINOIS, A CORPORATION OF MAINE.

LINK.

1,293,606.  Specification of Letters Patent.  Patented Feb. 4, 1919.

Application filed May 24, 1918. Serial No. 236,312.

*To all whom it may concern:*

Be it known that I, DONALD H. YOUNG, a citizen of the United States, residing at Chicago Heights, in the county of Cook and State of Illinois, have invented certain new and useful Improvements in Links, of which the following is a specification.

My invention relates to links and particularly to a track link for tractors.

One of the objects of my invention is to provide an integral link for tractor caterpillar treads which may be joined to adjacent links by self supported connecting means.

Another object is to provide a single integral track link having combined, the track for engaging the supporting wheels, the tread surface or grouser for engaging the ground, and means for connection to adjacent links.

A further object is to provide an integral tractor link which may be connected to or disconnected from the adjacent links by relative bodily movement, and the provision of means for preventing said movement under normal conditions of use.

The advantages of my invention include, among others, the provision of simplicity and durability; saving of time in removing or replacing at any point in the track; reduction of a great amount of friction; reduction of the number of wearing surfaces usually experienced in tractor tread chains, and a decided reduction in the number of parts comprising the track.

I accomplish the above recited and other objects by forming a cast link having a tread portion, a track portion and extensions at the front and rear ends of the link for engaging similarly arranged mating portions on adjacent links.

A better understanding of my invention will be apparent from an observation of the drawings, in which—

Figure 1 shows an elevation of the preferred embodiment of track link as joined to an adjacent link, only a portion of the latter being shown.

Fig. 2 is a bottom plan view of the links as shown in Fig. 1, and

Fig. 3 is a fragmentary view showing a modified form of connecting means.

In the drawings, 5 represents the tread grouser or base plate, which is of the usual wave-like form in elevation. 6 represents the rail members which engage the bearing wheels or rollers on the frame of the tractor and through which the weight is transmitted to the bottom run of the chain. In the embodiment shown in the drawings, the rear portion of the link is provided with a knuckle 7 having cast integrally therewith studs 8 extending at angles of 90 degrees with the portions 7. Another knuckle 9 is shown having aperture 10 therethrough. The other end of the link is provided with two knuckles 11 with apertures 12 therethrough and a single knuckle 13 carrying a stud 14. The distance between the end 8ª of the inner stud 8 and the rear face 7ª of the next adjacent knuckle 7 is slightly greater than the width of the knuckle 11 so that to join adjacent links the knuckles 11 on the front edge are moved so that the apertures therein overlie the ends of the studs 8 and so the stud 14 on the front edge of the link registers with the aperture 10, in the knuckle 9 on the rear edge of the link. Thereupon, by relative bodily movement the links are connected as shown in Fig. 2. Because of the fact that relative angular movement of the adjacent links occurs as the chain passes over the sprocket wheels, it is necessary to provide means for preventing lateral relative movement of adjacent links under normal conditions of service so as to disconnect same, and to permit said relative movement only when the adjacent links are moved into abnormal relative position. The means which I prefer to employ include extensions 15 of the front edges of the base portion 5 and by providing slots or notches 16 in the front ends of the extensions 7 so that when adjacent links are to be connected, the projections 15 are brought to register with the slots 16 and then relative bodily movement of the parts may be made by inserting the studs 8, 14, in the apertures 10, 12, in the correspondingly disposed knuckles. Then the links are flattened so as to present the appearance shown in Fig. 1. It will be observed that I have provided self containing means having connecting adjacent links and for preventing separation under normal conditions. With a traction chain formed of links of my invention, it is possible to adjust the length thereof or replace broken or worn links whenever desired. A great advantage resides in the fact that it is possible to form chains of any size desirable by connecting together a number of links all cast in the same manner and from the same pattern, all made in the same way and doing away with the necessity of rights and lefts or special connections.

In the modifications shown in Fig. 3, I have extended the studs 14' so that the outer end when inserted will project slightly beyond the outer face of the knuckle and through the outer end of the stud 14' I have formed an aperture in which may be inserted a cotter pin 17, or the like with which arrangement the provision of the extensions 15 and the slots 16 is made unnecessary. Either method of fastening is secure and prevents disassociation of the parts under normal conditions of service.

As a means for receiving the driving force applied through the teeth on the sprocket driving wheels, the track shoes are provided with members 18 cast integrally with the shoes and having inclined faces 19 and 20 preferably arranged as shown in the drawings. The inclined faces 19 will be engaged by the sprocket teeth as the caterpillar is moving toward the right in Fig. 1, while the faces 20 will be engaged when the caterpillar is moving toward the left.

I am aware that modifications of such a device are possible and wish to include all such modifications as come within the scope of the appended claims.

I claim:

1. A traction chain link comprising a grouser, spaced rail members upon one side of the grouser, draft projections on the grouser at the rail side thereof, knuckles at opposite ends of each rail member and disposed in mutual offset relation, the knuckle at one end of each rail member being provided with a transverse cylindrical stud, and the knuckle at the opposite end of the same rail member having a transverse cylindrical opening of substantially the same diameter as that of the stud.

2. A traction chain link comprising a grouser, draft projections and rail members on one side of the grouser, mutually offset knuckles at opposite ends of the grouser, one of the knuckles having a transverse cylindrical stud, the opposite knuckle having a transverse cylindrical opening of substantially the same diameter as that of the stud, the longitudinal axis of the stud and the opening being in a plane parallel to that of the rail members, one of the knuckles being provided with a transverse notch across the edge thereof at one side of the plane including the centers of the stud and the opening, and the opposite end of the grouser being provided with a projection at the opposite side of said plane and out of alinement with the notched knuckle.

3. A traction chain made up of a plurality of links, each link comprising a grouser provided with draft projections and rail members on one side thereof, adjacent ends of successive links being provided with complementary knuckles, one of the knuckles having a transverse cylindrical pivot stud, the other knuckle having a transverse cylindrical opening pivotally receiving the stud, one of the knuckles being provided with a transverse notch across one edge thereof, and the other link having a projection offset from the knuckle of said link, the knuckle of the other link lying between said projection and the knuckle of the first mentioned link and out of alinement with the notch in the normal operative relation of the links, said links capable of abnormal pivotal movement on the pivot stud to bring the projection into alinement with the notch and also capable of lateral movement to pass the projection through said notch.

4. A traction chain link comprising a grouser provided on one side with rail members projecting at the front and rear of the grouser, the projecting end portions of each rail member constituting knuckles offset with respect to one another, the knuckle at one end of one of the rail members and the knuckle at the opposite end of the other rail member each provided with a transverse cylindrical pivot stud, the knuckles at the other ends of said member being provided with transverse cylindrical openings of substantially the same diameter as each of the studs, each of the stud knuckles having a transverse open ended notch in one edge thereof and at one side of the plane which includes the centers of the studs and the openings, and the front and rear of the grouser being provided with projections lying at the opposite side of said plane, each projection being spaced from the adjacent pivot opening knuckle a distance at least equal to the width of one of the stud knuckles.

Signed at Chicago Heights, Illinois, this 17th day of May, 1918.

DONALD H. YOUNG.